United States Patent
Satoh et al.

(10) Patent No.: US 6,762,753 B2
(45) Date of Patent: Jul. 13, 2004

(54) TOUCH PANEL DEVICE

(75) Inventors: Yoshio Satoh, Kawasaki (JP);
Fumihiko Nakazawa, Kawasaki (JP);
Satoshi Sano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 09/842,227

(22) Filed: Apr. 26, 2001

(65) Prior Publication Data

US 2002/0097231 A1 Jul. 25, 2002

(30) Foreign Application Priority Data

Dec. 1, 2000 (JP) ........................................ 2000-367645

(51) Int. Cl.$^7$ ................................................. G09G 5/00
(52) U.S. Cl. ........................ 345/177; 345/173; 345/175
(58) Field of Search ................................. 345/177, 173, 345/175, 176; 310/313 R, 313 B

(56) References Cited

U.S. PATENT DOCUMENTS

| | | | |
|---|---|---|---|
| 3,684,828 A | | 8/1972 | Maher |
| 5,668,431 A | * | 9/1997 | Saw et al. ............... 310/313 R |
| 5,717,434 A | * | 2/1998 | Toda .......................... 345/177 |
| 5,767,608 A | * | 6/1998 | Toda ....................... 310/313 R |
| 5,838,088 A | * | 11/1998 | Toda ....................... 310/313 R |
| 5,994,817 A | * | 11/1999 | Toda ....................... 310/313 R |

FOREIGN PATENT DOCUMENTS

| | | |
|---|---|---|
| EP | 0 397 539 A1 | 11/1990 |
| EP | 0 973 257 A3 | 1/2000 |
| JP | 55-153041 | 11/1980 |
| JP | 6-43995 | 2/1994 |
| JP | 6-75688 | 3/1994 |
| JP | 6-75689 | 3/1994 |
| JP | 6-149459 | 5/1994 |
| JP | 10-301699 | 11/1998 |
| JP | 10301700 | 11/1998 |
| JP | 11-21925 | 1/1999 |

OTHER PUBLICATIONS

Takashi Shiba et al., Reference Material in the 46$^{th}$ Meeting of Gakusin 150 Committee, pp. 107–110, 1996.

Hajime Maruyama, et al., Institute of Electronics, Information and Communication Engineers, Corona Publishing Co., Ltd., 1998, pp. 72–75.

G.S. Brady, H.R. Clauser, J.A. Vaccari: "Materials Handbook, 14$^{th}$ Edition" 1997, McGraw–Hill, New York, US XP002248550, pp. 718–722.

"Analog Matched filter Using Tapped Acoustic Surface Wave Delay Line", *IEEE Transactions on Microwave Theory and Techniques*, Nov. 1969, pp. 1042–1043.

* cited by examiner

Primary Examiner—Steven Saras
Assistant Examiner—Fritz Alphonse
(74) Attorney, Agent, or Firm—Westerman, Hattori, Daniels & Adrian, LLP

(57) ABSTRACT

A touch panel device includes a plurality of input IDTs for exciting surface acoustic waves and a plurality of output IDTs for receiving the surface acoustic waves, corresponding to a plurality of tracks on a non-piezoelectric substrate, and each input IDT has a wideband electrode structure and each output IDT has a matched filter structure for outputting a large output upon receipt of a specific binary signal sequence. A signal obtained by arranging a plurality of specific signal sequences in time series is applied to each input IDT.

18 Claims, 16 Drawing Sheets

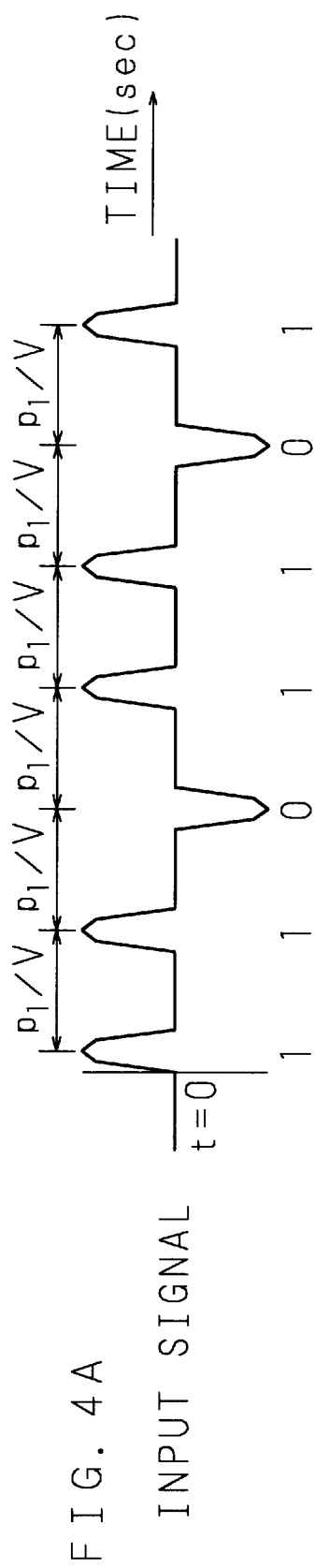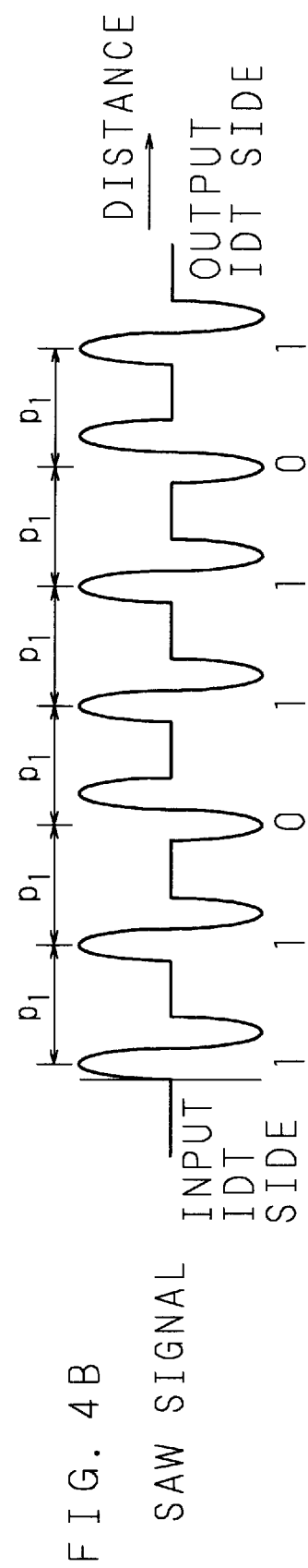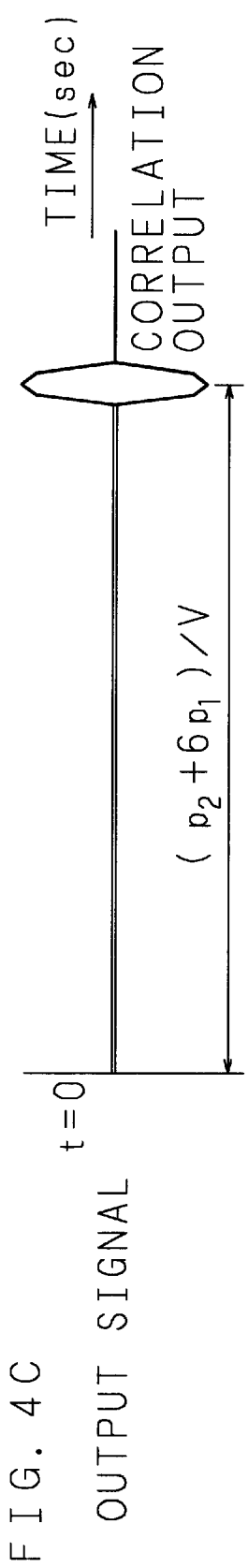

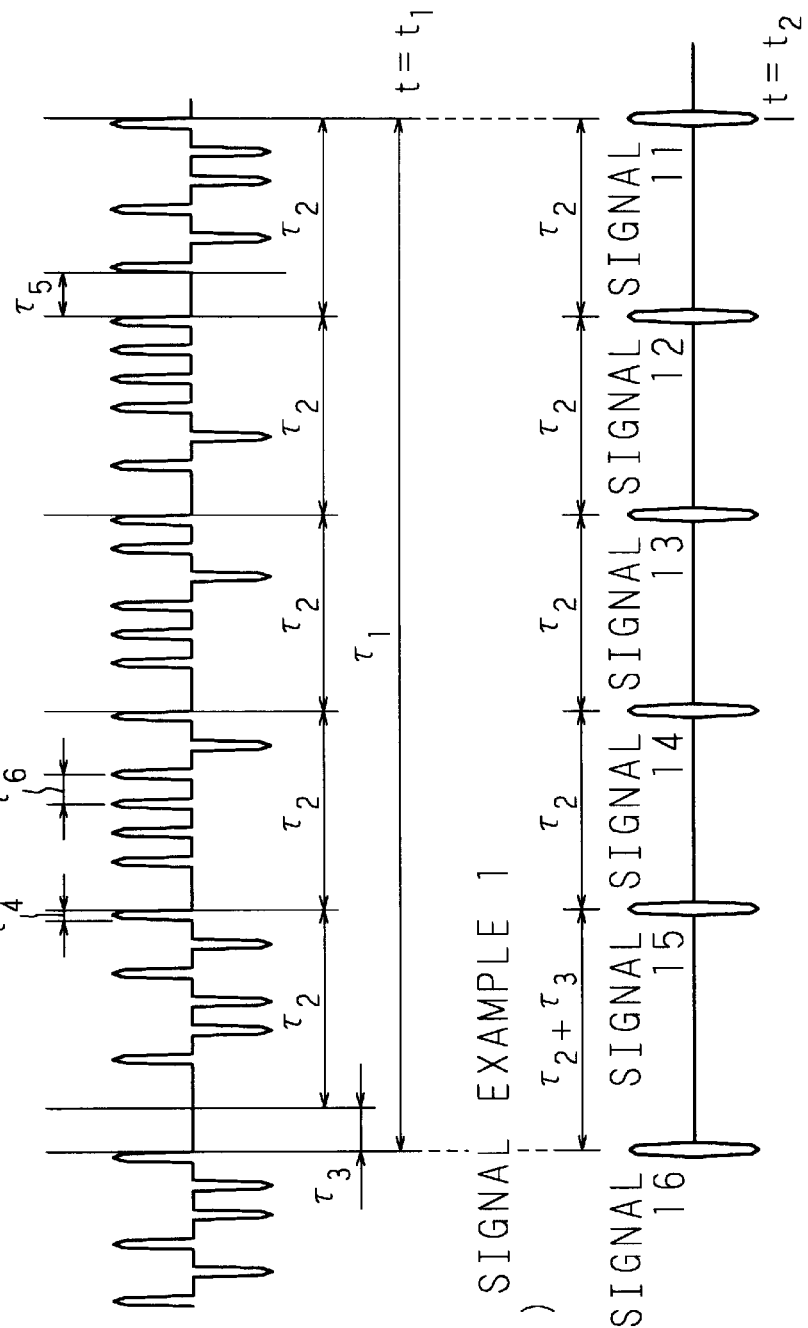

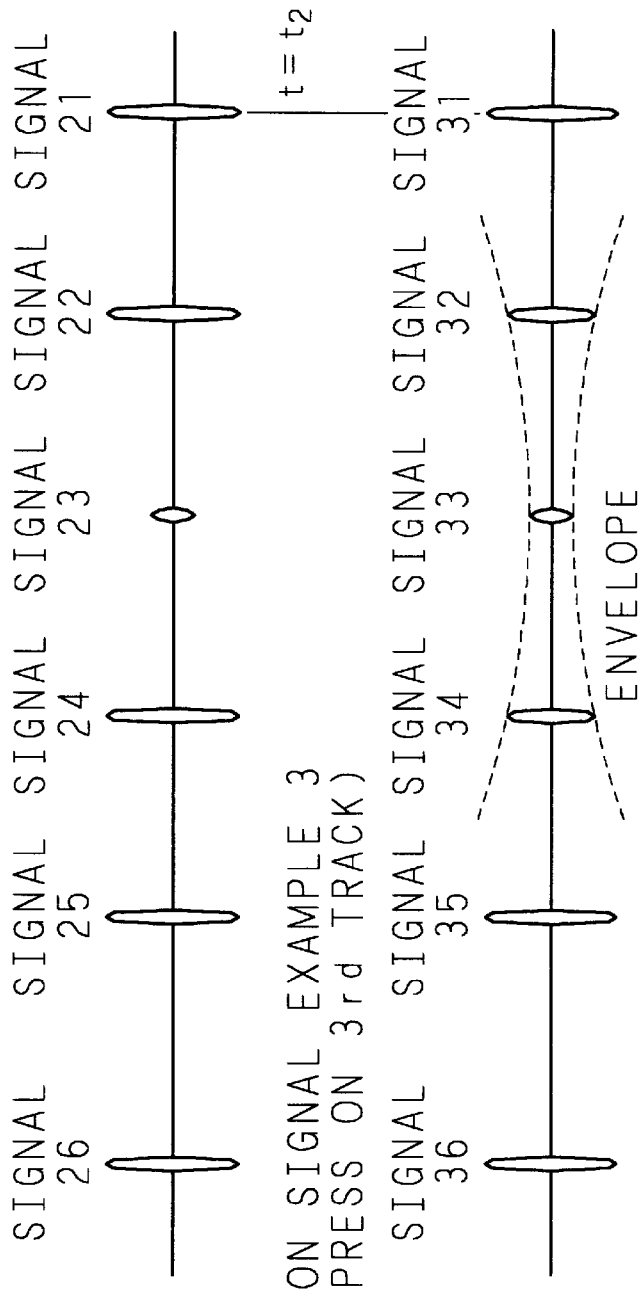
FIG. 8C DETECTION SIGNAL EXAMPLE 2 (PRESS ON 3rd TRACK)
FIG. 8D DETECTION SIGNAL EXAMPLE 3 (LARGE PRESS ON 3rd TRACK)
FIG. 8E READOUT GATE SIGNAL

TOUCH PANEL DEVICE

BACKGROUND OF THE INVENTION

The present invention relates to a touch panel device for detecting the touch of a finger or an object, and more specifically relates to a touch panel device using IDTs for detecting such a touch by detecting a cutoff of a surface acoustic wave.

With the spread of computer systems, mainly personal computers, there has been used a device for inputting new information or giving various instructions to a computer system by pointing at a position on a display screen of a display device on which information is displayed by the computer system, with a finger or an object. In order to perform an input operation with respect to the information displayed on the display screen of the display device of a personal computer or the like by a touching method, it is necessary to detect a touched position (indicated position) on the display screen with high accuracy.

Examples of known touch panel devices for detecting the position touched by a finger or an object are classified into: ① a resistance film type; ② an electrostatic capacity type; ③ an electromagnetic induction type; and ④ an ultrasonic wave type. Although both ① and ② are of types using a light lucent conductive film of, for example, ITO (Indium Tin Oxide), the light lucent conductive film is not perfectly transparent, and therefore these types have a problem in the aspect of brightness because about 20% of the quantity of light is lost when light from a liquid crystal display surface passes through a touch panel unit. Besides, in the case where a touch panel device of such a type is employed in a reflective type liquid crystal display device, since light passes through the touch panel unit twice, the brightness problem is enhanced. On the other hand, type ③ has a difficulty in reducing the size and also has a problem that a special input pen is required.

In contrast, type ④ detects a position touched by a finger or an object by propagating a surface acoustic wave (hereinafter also referred to as the "SAW") along a glass plate serving as a non-piezoelectric substrate, for example, and detecting attenuation of the surface acoustic wave caused by the touch of the finger or object on the glass plate (Japanese Patent Application Laid-Open No. 55-153041/ 1980, etc.). This ultrasonic wave type achieves an excellent transparency and requires no special input pen.

However, in conventional touch panel devices of the ultrasonic wave type, since transducers for generating surface acoustic waves and detecting the same are constructed by ceramic transducers, this type of touch panel devices have problems, such as difficulty in reducing the thickness and size, higher costs of the parts and difficult mounting, in comparison with the touch panel devices of other types. Moreover, it is necessary to provide a reflector along the edge of the glass plate, resulting in high costs on the whole.

Therefore, there has been proposed a type in which an IDT (Inter Digital Transducer: comb-like electrode) capable of being formed collectively using a photolithography technique is used as a transducer (Japanese Patent Applications Laid-Open Nos. 6-43995/1994, 6-75688/1994, 6-75689/ 1994, 6-149459/1994, 11-21925/1999, etc.). This type allows mass production, thereby achieving a reduction in the costs.

In this touch panel device, a plurality of excitation elements, each composed of an input IDT and a piezoelectric thin film, are provided on one end of the glass plate, and a plurality of receiving elements, each composed of an output IDT and a piezoelectric thin film similarly, are provided on the other end of the glass plate at positions opposite to the excitation elements. Electric signals are inputted to the respective excitation elements to excite the surface acoustic waves and propagate the surface acoustic waves along the glass plate, and the propagated surface acoustic waves are received by the receiving elements. Then, if a finger or an object touches the propagation path of the surface acoustic wave along the glass plate, the surface acoustic wave is attenuated. It is therefore possible to detect whether touching is made and the touched position by detecting whether there is attenuation in the level of the receiving signals of the receiving elements.

FIG. 1 is an illustration showing the structure of such a conventional touch panel device using IDTs. In FIG. 1, numeral 1 is a glass plate, and a plurality of input IDTs 2 for exciting a surface acoustic wave are arranged into a line on one end of each of the X-direction and Y-direction of the glass plate 1 so that the input IDTs 2 correspond to a plurality of tracks, respectively. Moreover, a plurality of output IDTs 3 for receiving the surface acoustic wave are arranged stepwise on the other end of each of the X-direction and Y-direction of the glass plate 1 so that the output IDTs 3 face the input IDTs 2. With such a positional arrangement, the distance between the input IDT2 and output IDT 3 is varied according to each track so as to vary the receiving timing in the respective output IDTs 3, so that a track on which the receiving signal is attenuated can be identified accurately.

In the touch panel device having such a structure, the output IDTs 3 need to be arranged stepwise so as to vary the time from the excitation of the surface acoustic wave to the reception thereof in each track, and therefore problems arise that, a region for providing the input IDTs 2 and output IDTs 3 (hereinafter referred to as the "frame region") is wide and a region where the touched position is detectable (hereinafter referred to as the "detection region") is relatively narrow as shown in FIG. 1. Such problems become severer as the number of tracks is increased, and thus this positional arrangement is not practicable. Hence, there is a demand for the development of a touch panel device which is capable of identifying the respective tracks by a technique different from a technique based on the difference in the propagation time, and capable of arranging not only the input IDTs 2 but also the output IDTs 3 into a line.

BRIEF SUMMARY OF THE INVENTION

It is an object of the present invention to provide a touch panel device capable of arranging both of the input IDTs and output IDTs respectively into a line, narrowing a frame region and widening a detection region.

Another object of the present invention is to provide a touch panel device capable of always accurately detecting a touched position without being affected by a change in a temperature environment.

A touch panel device according to the first aspect is a touch panel device comprising a plurality of input IDTs for exciting surface acoustic waves and a plurality of output IDTs for receiving the surface acoustic waves, correspondingly to a plurality of tracks of a non-piezoelectric substrate, for propagating surface acoustic waves along the non-piezoelectric substrate between the input IDTs and the output IDTs and detecting a position of an object touching the non-piezoelectric substrate based on results of receiving the surface acoustic waves by the output IDTs, wherein each of the plurality of input IDTs has a wideband electrode structure, each of the plurality of output IDTs has a matched filter structure for obtaining an output signal upon receipt of a specific signal sequence, and the specific signal sequence is varied according to each of the plurality of tracks.

In the touch panel device of the first aspect, each input IDT has a wideband electrode structure, and each output IDT has a matched filter structure for obtaining an output signal upon receipt of a specific signal sequence, so that each output IDT outputs an output signal only when it receives a specific signal sequence set for itself but outputs no output signal upon receipt of other signal sequences. Moreover, since the specific signal sequence is varied according to each of a plurality of tracks, the output IDTs corresponding to a plurality of tracks can never output their output signals simultaneously with respect to a single specific signal sequence. Therefore, even when the input IDTs and output IDTs are respectively arranged into a line, it is possible to detect to which track an output signal is related. Hence, the frame region can be narrowed, and a large detection region can be obtained.

A touch panel device according to the second aspect is based on the first aspect, and comprises: an application unit for generating mutually different specific signal sequences in time series and simultaneously applying the generated time-series signal sequences to a plurality of input IDTs, respectively; and a detection unit for synthesizing output signals of the respective output IDTs and detecting a position of a track touched by the object, based on a result of the synthesis. In the touch panel device of the second aspect, signal sequences obtained by arranging signal sequences matching the respective output IDTs in time series are simultaneously applied to the respective input IDTs, and a touched position is detected based on a synthesized signal of the output signals of the respective output IDTs. It is therefore possible to identify a touched track with a simple structure. Moreover, since the surface acoustics waves from the respective input IDTs are always excited in the same phase, a diffraction problem does not occur, thereby improving the detection accuracy.

A touch panel device according to the third aspect is based on the second aspect, wherein a predetermined time interval is introduced between adjacent signal sequences arranged in time series during application of the time-series signal sequences to the plurality of input IDTs, respectively. In the touch panel device of the third aspect, when arranging a plurality of specific signal sequences matching the respective output IDTs in time series, a predetermined time interval is introduced between adjacent signal sequences. It is therefore possible to clearly distinguish the respective signal sequences and prevent an erroneous operation of signal detection.

A touch panel device according to the fourth aspect is based on any one of the first through third aspect, wherein gate signals are generated according to receiving timings of signal sequences matching the plurality of output IDTs, respectively, to selectively fetch an output signal of each of the plurality of output IDTs by masking. In the touch panel device of the fourth aspect, an output signal of a signal sequence corresponding to each output IDT is selectively fetched by performing masking using a gate signal. It is therefore possible to accurately detect only an output signal of a signal sequence matching an output IDT itself and prevent an erroneous operation of signal detection.

A touch panel device according to the fifth aspect is based on any one of the first through fourth aspects, wherein a plurality of input IDTs and/or a plurality of output IDTs are grouped into a plurality of blocks, and a position touched by the object is detected independently in each block. In the touch panel device of the fifth invention, a plurality of input IDTs and/or a plurality of output IDTs are grouped into blocks, and detection processing is performed independently in each block. Therefore, even when the detection region is wide and the number of tracks is large, it is possible to readily perform the detection.

A touch panel device of the sixth aspect is based on the fifth aspect, wherein a same specific signal sequence is doubly used for different blocks. In the touch panel device of the sixth aspect, the same signal sequence can be used for different blocks. Therefore, even when the detection region is wide and the number of tracks is large, it is possible to set signal sequences effectively.

A touch panel device according to the seventh aspect is based on any one of the first through sixth aspects, and further comprises at least one set of input/output IDTs for detecting a temperature of the non-piezoelectric substrate. In the touch panel device of the seventh aspect, a temperature is detected by at least one set of input/output IDTs provided on the non-piezoelectric substrate. It is therefore possible to perform an accurate detection operation by considering a change in temperature which affects the velocity of a surface acoustic wave.

A touch panel device according to the eighth aspect is based on the seventh aspect, wherein an amplifier is connected to the input/output IDTs for temperature detection so as to construct a surface acoustic wave oscillator, and temperature compensation is performed using an oscillation signal of the surface acoustic wave oscillator. In the touch panel device of the eighth aspect, temperature compensation is performed using an oscillation signal of the surface acoustic wave oscillator for oscillating a surface acoustic wave according to a temperature. It is therefore possible to carry out temperature compensation in real time and perform an accurate detection operation.

A touch panel device according to the ninth aspect is based on the eighth aspect, wherein the input/output IDTs for temperature detection have a fundamental period identical with a fundamental period of the input IDT and output IDT for position detection, synthesize an oscillation signal and the specific signal sequences, and apply the resultant synthesized signal to the input IDT for position detection. In the touch panel device of the ninth aspect, a synthesized signal obtained by synthesizing an oscillation signal of the surface acoustic wave oscillator and the specific signal sequences is applied to the input IDT for position detection. It is therefore possible to automatically compensate for a change in temperature.

The above and further objects and features of the invention will more fully be apparent from the following detailed description with accompanying drawings.

BRIEF DESCRIPTION OF THE SEVERAL VIEWS OF THE DRAWINGS

FIGS. 4A, 4B and 4C are illustrations showing operation signals of the surface acoustic wave matched filter;

FIGS. 8A, 8B, 8C, 8D and 8E are timing charts of various signals according to the first embodiment;

DETAILED DESCRIPTION OF THE INVENTION

The following description will explain in detail the present invention with reference to the drawings illustrating some embodiments thereof.

Figure 2:
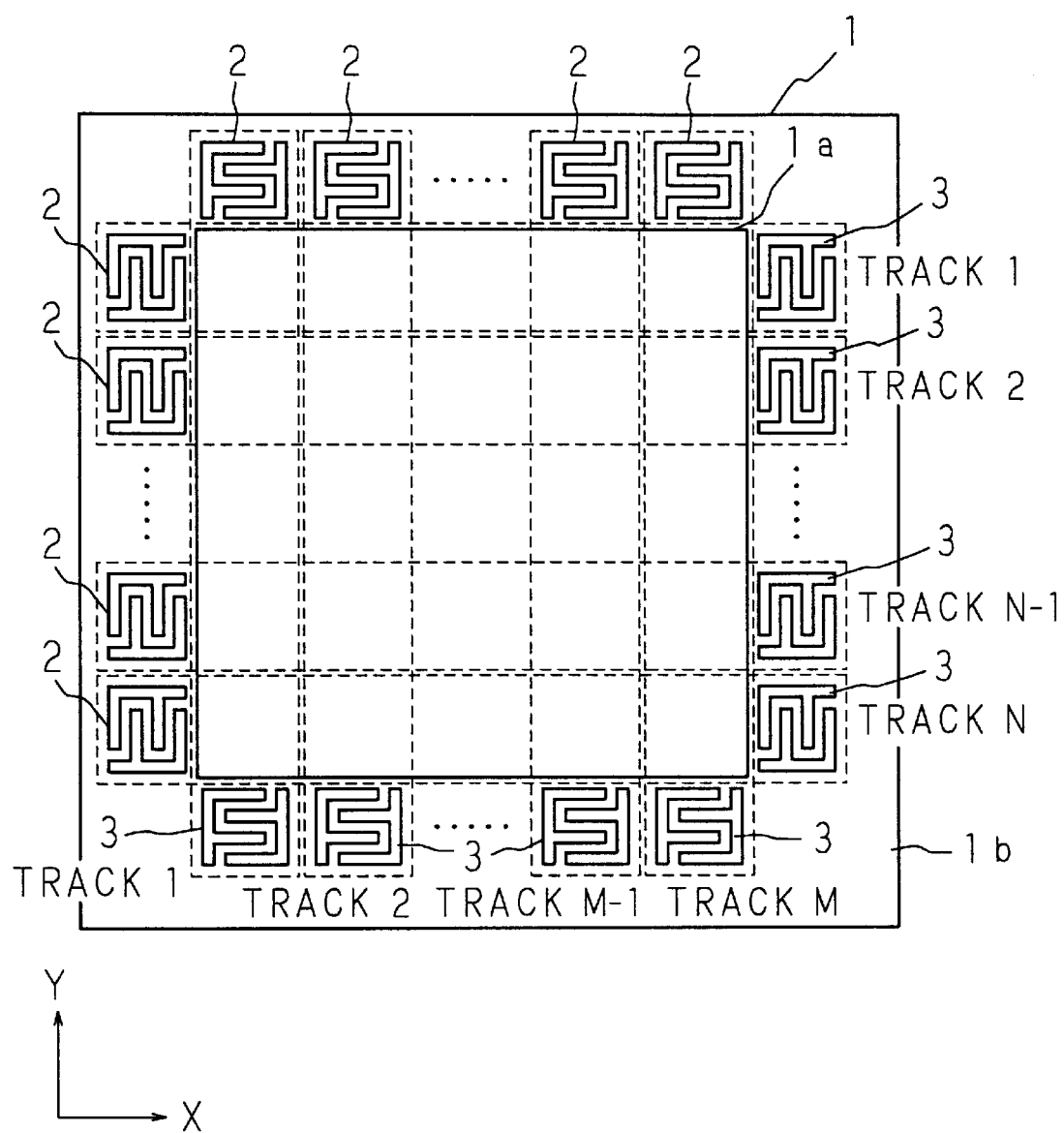
FIG. 2 is an illustration showing the basic structure of a touch panel device of the present invention.

FIG. 2 is an illustration showing schematically the basic structure of a touch panel device of the present invention. In FIG. 2, numeral 1 is a rectangular glass plate serving as a non-piezoelectric substrate, and a plurality (N pieces, M pieces) of input IDTs 2 for exciting a surface acoustic wave are arranged into a line on one end of each of the X-direction and Y-direction of the glass plate 1 so as to correspond to a plurality (N lines, M lines) of tracks, respectively. Moreover, a plurality (N pieces, M pieces) of output IDTs 3 for receiving the surface acoustic wave are arranged into a line on the other end of each of the X-direction and Y-direction so that the output IDTs 3 face the input IDTs 2, respectively.

Each input IDT 2 has a wideband electrode structure (comb-like metal pattern). On the other hand, each output IDT 3 has a matched filter electrode structure (comb-like metal pattern) that outputs an output signal only when a specific binary signal sequence is supplied.

The surface acoustic waves excited by the input IDTs 2 travel almost straight to propagate along the glass plate 1 and are then received by the output IDTs 3. A region surrounded by these input IDTs 2 and output IDTs 3 is a detection region 1a for detecting the position of an object, and N lines of tracks and M lines of tracks, which cross each other at right angles, are set in the X-direction and the Y-direction, respectively, within this detection region 1a. In the case where the input IDTs 2 and output IDTs 3 are arranged in such a manner, a frame region 1b is narrower in comparison with a conventional example shown in FIG. 1.

Next, the following description will explain the function of a matched filter used in the output IDT 3. A surface acoustic wave matched filter is a filter which outputs a large signal in response to only a specific binary signal sequence (binary information sequence) and outputs only noise signals in response to other binary signal sequences (see Takashi Shiba et al., Reference Material in the 46th Meeting of Gakusin 150 Committee, pp. 107–110, 1996, or S. T. Costanza et al., "Analog Matched Filter Using Tapped Surface Wave Delay Line", IEEE Trans., MTT-17, pp. 1042–1043, 1969, for detail).

Figure 3:
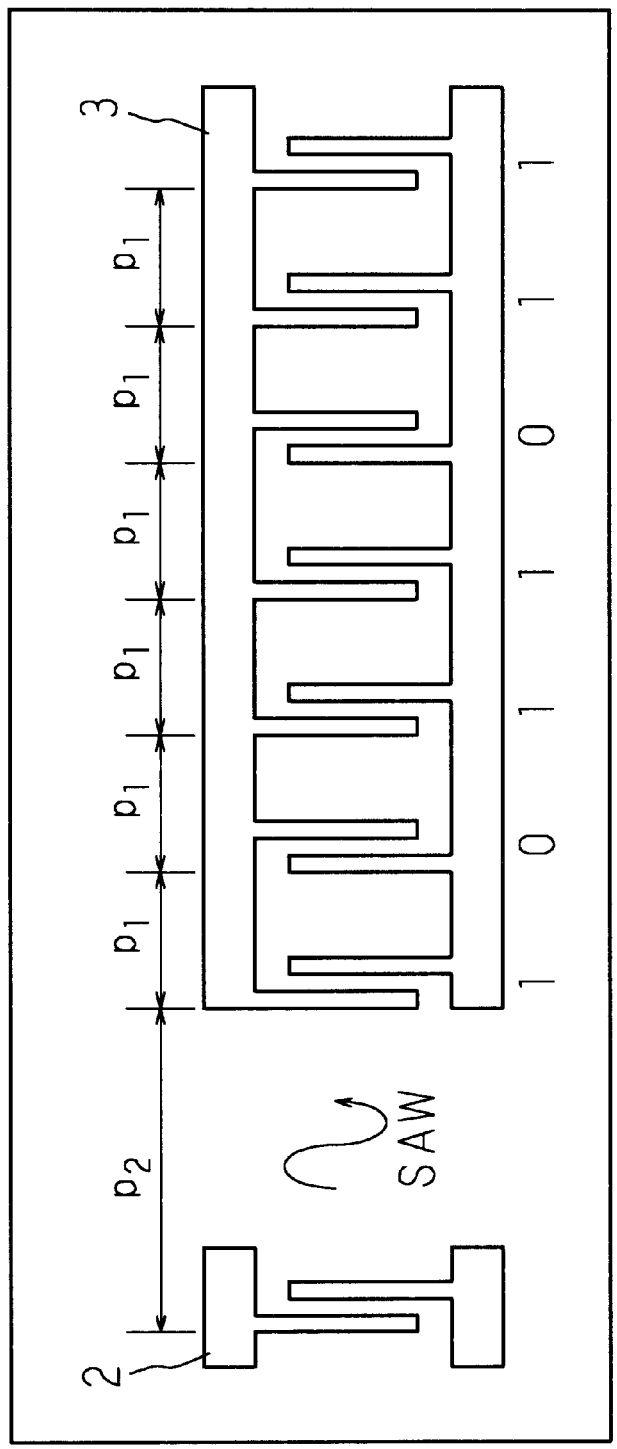
FIG. 3 is an illustration showing the basic structure of a surface acoustic wave matched filter.

FIG. 3 is an illustration showing the basic structure of this surface acoustic wave matched filter. As shown in FIG. 3, the input IDT 2 is constructed by a relatively small number of electrode pairs in order to obtain a wideband characteristic. Besides, in the output IDT 3, pairs of electrodes are formed to have a polarity of "1" or "0" at equal intervals (pitch $p_1$) in accordance with a specific binary signal sequence. In the example shown in FIG. 3, a 7-bit signal sequence of [1011011] is formed. In the case where "1" is the positive electrode arrangement, "0" is an arrangement of electrode of the opposite phase. Such a structural pattern is called the "tapped delay line".

Next, the operation of this surface acoustic wave matched filter will be explained. FIGS. 4A, 4B and 4C show operation signals (FIG. 4A: an input signal to the input IDT 2, FIG. 4B: a propagating surface acoustic wave, FIG. 4C: an output signal from the output IDT 3) of the surface acoustic wave matched filter.

Here, an input signal [1101101] that changes with time is applied to the input IDT 2. This is the reverse order of the electrode pattern [1011011] of the output IDT 3. With the application of the input signal, the surface acoustic wave is excited and propagates toward the output IDT 3 in the order of "1" or "0" as shown in FIG. 4B. The propagated surface acoustic wave reaches the output IDT 3, and, after passage of $(p_2+6p_1)/V$ second ($p_2$: the propagation distance on the glass plate 1, $p_1$: the signal pitch, V: the velocity of the surface acoustic wave) from the excitation, when the leading "1" of the excited surface acoustic wave has just reached the final pattern "1" of the output IDT 3, the signal sequence of the surface acoustic wave and the pattern of the output IDT 3 agree with each other. At this time, the output IDT 3 generates a large correlation output (FIG. 4C). The contents as described above are the basic operation of the surface acoustic wave matched filter.

Even if the input signal sequence has an at least one bit difference from the pattern of the output IDT 3, such a large output is not obtained. In order to improve the SIN ratio between the case where a signal sequence matching the pattern of the output IDT 3 is input and the case where a signal sequence different from the pattern of the output IDT 3 is input, it has been known that a group of predetermined information sequences may be used. This is a binary PN (Pseudo Noise) code sequence, and M-sequence, Barker code, Gold-sequence, etc. have been known. These binary PN code sequences have been actively used in spectrum spread communication at present. With the use of such a binary PN code sequence, it is possible to construct a matched filter with an excellent SIN ratio.

In a touch panel device of the present invention, the characteristics of such a surface acoustic wave matched filter are used. In other words, in a conventional structure, the tracks are identified based on the difference in the propagation time resulting from varying the propagation distance of the surface acoustic wave according to each track, but in the present invention, the tracks are identified by setting different code sequences for the respective output IDTs provided to correspond to the respective tracks and finding whether an output signal is obtained. Accordingly, unlike the stepwise arrangement of the output IDTs of the conventional example, it is possible to arrange the output IDTs into a line, thereby significantly narrowing the frame region.

The present invention will be explained in great detail below.

First Embodiment

Figure 5:
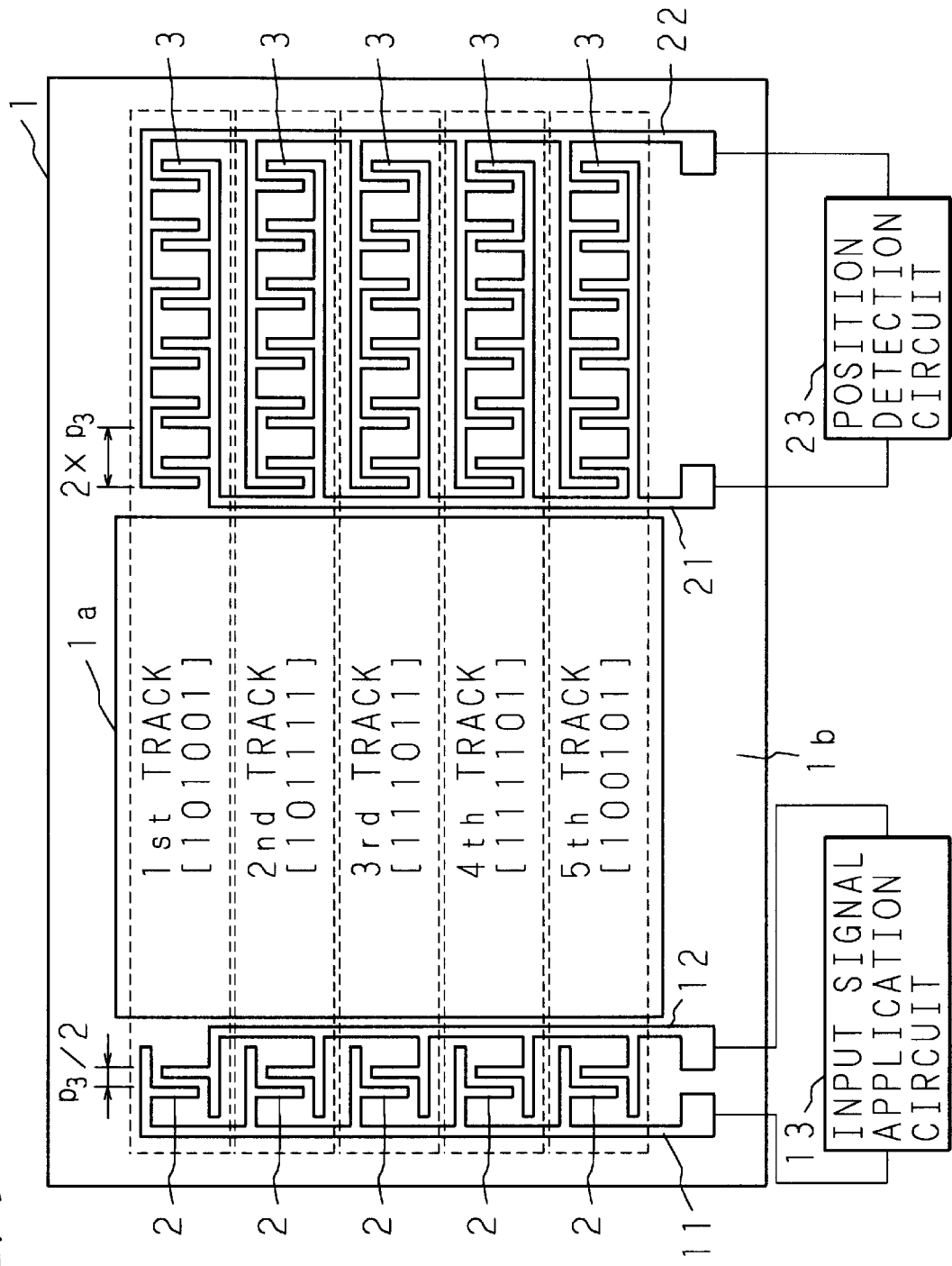
FIG. 5 is an illustration showing the structure of the first embodiment.

FIG. 5 is an illustration showing the structure of the first embodiment. In this embodiment, for the sake of easy explanation, let detect a touched position in the Y-direction between the orthogonal X-direction and Y-direction and the number of tracks be 5 tracks (N=5). Additionally, the width of a single track is set around 250 μm (100 dpi) to 2.5 mm (10 dpi) though it varies according to the screen size and the detection accuracy, and therefore around 29 tracks with 10 dpi or 290 tracks with 100 dpi are required for a detection in the direction of the long side of the display screen having a size of 5 inches, for example, and a less number of tracks is required for a detection in the direction of the short side thereof. Note that the X-direction and the Y-direction are named for the sake of convenience of explanation, and either of the directions may certainly represent the long side or the short side.

The first to fifth input IDTs 2 corresponding to the respective five tracks are mutually connected in parallel by input connecting lines 11 and 12, and also connected to an input signal application circuit 13 for applying a predetermined time-series signal to the respective input IDTs 2. The input signal application circuit 13 is supplied with a predetermined clock signal, generates a specific signal sequence matching each of the output IDTs 3 in time series, and applies the generated time-series signal sequence to the respective IDTs 2 simultaneously.

Each input IDT 2 has two mutually intricate electrode fingers made of aluminum (Al), for example, and the respective input IDTs 2 have a wideband electrode structure (comb-like metal pattern) of the same shape. Further, in the example shown in FIG. 5, while each input IDT 2 has a pair of electrodes (one "+" electrode finger and one "−" electrode finger), the input IDT 2 may have several pairs to several tens of pairs of electrodes if it has a wideband characteristic. However, if the number of pairs of electrodes in each input IDT 2 is not one, the number of pairs of the electrodes in the output IDT 3 needs to be changed according to the number of pairs of the electrodes in the input IDT 2.

The first to fifth output IDTs 3 corresponding to the respective five tracks are arranged to face the first to fifth input IDTs 2, respectively. These first to fifth output IDTs 3 are mutually connected in parallel by output connecting lines 21 and 22, and also connected to a position detection circuit 23 for detecting the touched position based on the output signals (detection signals) of the output IDTs 3.

Each output IDT 3 has six pairs of mutually intricate electrode fingers made of aluminum (Al), for example, and has a matched filter structure, but the match pattern is different in each output IDT 3. In other words, unique signal sequences are written for the first to fifth output IDTs 3, respectively, by the polarities of the electrode fingers, and matched filters having mutually different code sequences are formed. In this embodiment, since the number of tracks is as small as five, a 6-bit M-sequence is used as a code sequence. In the output IDT 3, the pairs of the electrode fingers are arranged at a pitch ($2p_3$) twice larger than a pitch ($p_3$) of the electrode fingers of the input IDT 2. The polarities of the electrode fingers are opposite between a code "1" and a code "0".

The surface acoustic waves excited simultaneously by the respective input IDTs 2 travel almost straight to propagate along the glass plate 1 and are then received by the respective output IDTs 3. A region sandwiched by these five input IDTs 2 and five output IDTs 3 is a detection region 1a, and five tracks fractionated in the Y-direction are set within this detection region 1a. The code sequences written for the respective tracks are [101001] for the first track; [101111] for the second track; [111011] for the third track; [111101] for the fourth track; and [100101] for the fifth track, and the polarities of the electrode fingers of the first to fifth output IDTs 3 are designed in accordance with these code sequences.

Figure 6:
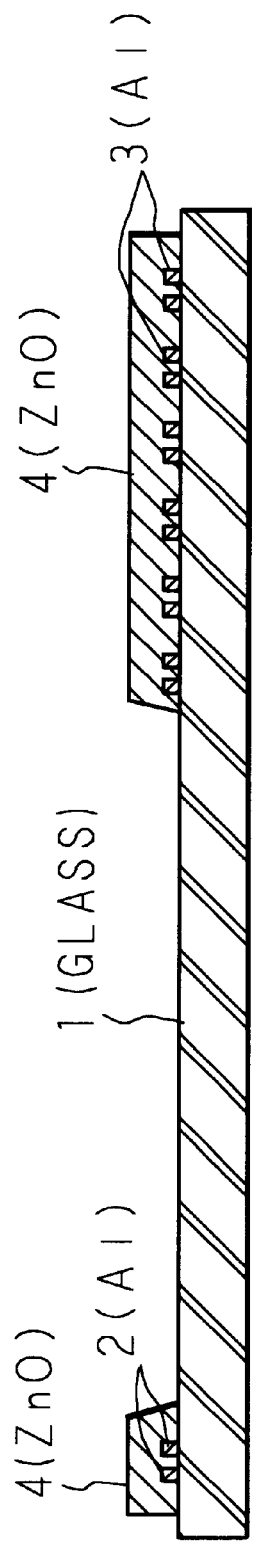
FIG. 6 is a cross sectional view of a touch panel device.

FIG. 6 is a cross sectional view of this touch panel device. An excitation element is formed by an input IDT 2 and a piezoelectric thin film 4 layered on the input IDT 2, while a receiving element is formed by an output IDT 3 and a piezoelectric thin film 4 layered on the output IDT 3. In the detection region 1a of the glass plate 1, the piezoelectric thin film 4 is not present, while the frame region 1b of the glass plate 1 is covered with the piezoelectric thin film 4. For the piezoelectric thin films 4 for exciting and receiving a surface acoustic wave by the piezoelectric effect, it is possible to use, for example, zinc oxide (ZnO) and aluminum nitride (AlN). Further, in FIG. 5, illustration of the piezoelectric thin film 4 is omitted. The patterns of the input IDTs 2 and output IDTs 3 are formed on the glass plate 1 by a thin film of aluminum or the like by evaporation or sputtering, and, after forming the piezoelectric thin film 4 over the entire region by sputtering, the piezoelectric thin film 4 on a display section (the detection region 1a) is removed.

Figure 7:
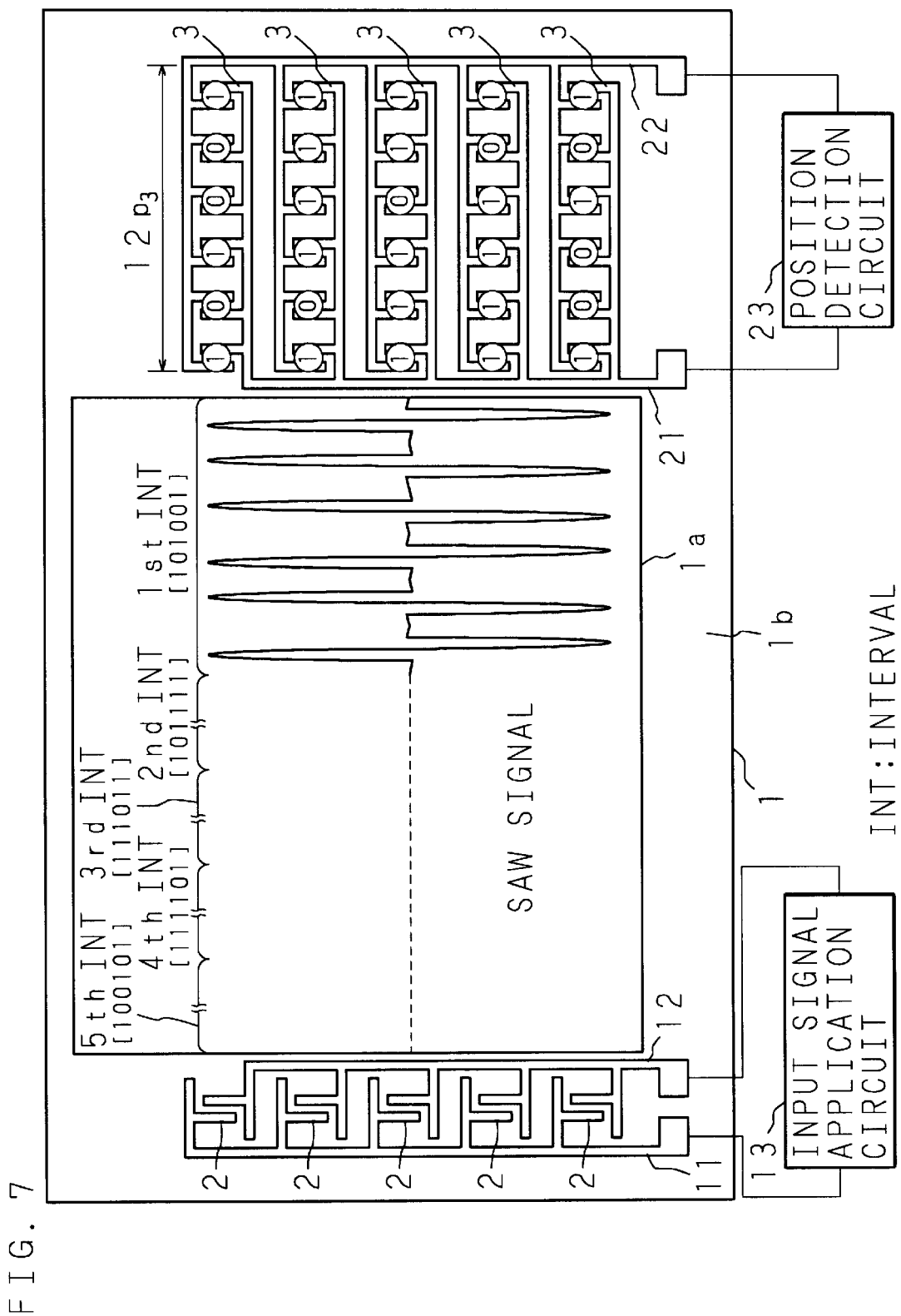
FIG. 7 is an illustration showing a propagation state of the surface acoustic wave according to the first embodiment.

FIG. 7 is an illustration showing a propagation state of the surface acoustic wave according the first embodiment, and FIGS. 8A, 8B, 8C, 8D and 8E are illustrations showing examples of the waveform of various signals according to the first embodiment. As illustrated in FIG. 7, a write signal (input signal) is applied simultaneously to the first to fifth input IDTs 2. This write signal is one obtained by arranging a code sequence of the first output IDT 3(the first interval), a code sequence of the second output IDT 3(the second interval), a code sequence of the third output IDT 3(the third interval), a code sequence of the fourth output IDT 3 (the fourth interval) and a code sequence of the fifth output IDT 3 (the fifth interval) in this order in time series.

The time order of writing the respective intervals is such that, for example, for the first interval [101001], the codes are written in the order of "100101" that is reverse to the order of the code sequence of the first output IDT 3. In such a case, the surface acoustic waves are excited simultaneously on the respective tracks by this signal sequence, and propagate from the input IDTs 2 to the output IDTs 3 through the glass plate 1. At this time, the propagating surface acoustic waves are synchronized in each track and serve as the same signal, thereby keeping the same phase plane. Therefore, even when the width of the respective tracks is reduced, there is an advantage of decreasing unnecessary loss due to a bent of the phase plane by diffraction, in comparison with a conventional case of sequentially sweeping the respective tracks.

The time-series surface acoustic waves propagating simultaneously along the respective tracks reach the output IDTs 3 sequentially if no object touches the glass plate 1. First, the signal sequence [101001] of the first interval reaches the respective first to fifth output IDTs 3 simultaneously. This signal sequence [101001] matches the first output IDT 3, but does not match any of other second to fifth output IDTs 3. As a result, a large signal is output only from the first output IDT 3, but it is not output from any of other second to fifth output IDTs 3. Since the first to fifth output IDTs 3 are all connected in parallel, the large detection signal obtained at the first output IDT 3 is sent to the position detection circuit 23 via the output signal lines 21 and 22. In FIG. 8B in which the above-mentioned contents are expressed as the electric signal sequences on the time base, a signal 11 is a detection signal corresponding to the first interval.

Next, the surface acoustic wave of the signal sequence [101111] of the second interval reaches the respective first to fifth output IDTs 3 simultaneously and only matches the second output IDT 3, and consequently a large detection signal (signal 12 of FIG. 8B) is output only from the second output IDT 3, but it is not output from any of other first, third to fifth output IDTs 3.

Then, similarly, as the signal sequences of the third, fourth and fifth intervals sequentially reach the output IDTs 3, they sequentially match the third, fourth and fifth output IDTs 3, and consequently large detection signals (signals 13, 14 and 15 of FIG. 8B) are output therefrom, respectively. After one cycle of the input signal pattern, the process returns to the signal sequence of the first interval and a large detection signal (signal 11 of FIG. 8B) is output from the first output IDT 3.

The process as described above is an example in which no object touches the glass plate 1. Next, the following description will explain the case where an object touches the third track of the glass plate 1, for example.

In this case, the surface acoustic wave propagating along the third track is attenuated and does not reach the third output IDT 3. Therefore, since the signal sequence [111011] of the third interval does not reach the third output IDT 3 either, an intended large detection signal (signal 13 of FIG. 8B) is not obtained, but a small detection signal (signal 23 of FIG. 8C) is obtained or perfectly disappears. If timing of obtaining the large detection signal and a track number corresponding to that timing are identified in advance, it is possible to find that an object touches the third track by detecting a change in the magnitude of the detection signal (a change from the signal 13 of FIG. 8B to the signal 23 of FIG. 8C).

In the case where the object is large and the influence of the touch of the object extends over adjacent tracks, the detection signals of the second and fourth tracks (signals 32 and 34 of FIG. 8D) are also attenuated. It is therefore possible to detect not only the position touched by the object and the size of the touching object with accuracy from the attenuation state (the envelope form), but also the press strength from the degree of attenuation of these detection signals.

Next, the following description will explain time setting of the signal sequences to be applied. In this example, the fundamental period of 1 bit is $\tau_4$, and this fundamental period $\tau_4$ and the fundamental spatial period $p_3$ of the IDT of FIG. 5 establish the relationship $$\tau_4 = p_3/V \quad (1)$$

where V is the acoustic velocity of the surface acoustic wave under the IDT. This acoustic velocity V is constant if the material and the film thickness of the electrode are determined. However, the spatial period $p_3$ varies according to the value of a resonance frequency f of the IDT. Their relationship is expressed as $$p_3 = \tau_4 \times V = V/f \quad (2).$$

In this example, a predetermined space time $\tau_5$ is inserted between adjacent 6-bit code sequences corresponding to the respective output IDTs 3, i.e., between adjacent intervals. For this space time $\tau_5$, although any value no less than 0 can be set, simple specifications can be obtained based on the fundamental period $\tau_4$, and therefore the space time $\tau_5$ is preferably an integer multiple of $\tau_4$ as shown in (3) below. Note that, in the example shown in FIG. 8A, n=2.

$$\tau_5 = n \times \tau_4 \quad (3)$$

Therefore, a period $\tau_2$ of each interval is given as shown in (4) below.

$$\tau_2 = 6 \times 2 \times \tau_4 + \tau_5 \quad (4)$$

Moreover, while the time of one cycle of signal sequences corresponding to the respective tracks is $5 \times \tau_2$, a space time $\tau_3$ as shown in FIG. 8A may be inserted before the next cycle. Similarly to $\tau_5$ expressed by (3) above, this space time $\tau_3$ is preferably an integer multiple of $\tau_4$. A time $\tau_1$ taken for one sweeping of all the tracks is expressed as shown in (5) below.

$$\tau_1 = 5 \times \tau_2 + \tau_3 \quad (5)$$

By inserting such space times $\tau_5$ and $\tau_3$, it is possible to clearly distinguish between the intervals and prevent an erroneous operation of signal detection between the intervals. This aspect will be explained by illustrating a transition from the third interval to the fourth interval as an example. If the space time $\tau_5$ is not provided, a signal sequence [110111] is produced from the final 1 bit of the third interval and the leading 5 bits of the fourth interval between the output signals 13 and 14 and after 10 clocks from the output signal 13 (1 clock time is $\tau_4$), and the third output IDT 3 matches this signal sequence and outputs a large extra detection signal, resulting in an erroneous operation. In the present invention, since the space time $\tau_5$ is inserted between the third and fourth intervals, pattern matching does not occur if "0" is present therebetween, thereby avoiding an erroneous operation as mentioned above.

Incidentally, if it is difficult to provide the space time $\tau_5$ or if it is desired to perfectly prevent an erroneous operation, it is effective to mask unnecessary portions by the AND operation of readout gate signals (signals 41 to 46 of FIG. 8E) generated according to receiving timings as shown in FIG. 8E so as to selectively fetch the surface acoustic wave of a desired signal sequence.

Further, in the above-described example, the position detection of track in the Y-direction is described, but, if the completely same structure is adopted for the X-direction, it is possible to detect the position touched by the object from the cross point of tracks detected in both the directions. In this case, for the code sequences of the respective tracks in the X-direction, the same code sequences as those used in the Y-direction may be doubly used. Moreover, while five tracks are set, this number of tracks is a merely an example, and actually a greater number of tracks are required. In this case, the fundamental theory is the same, and the present invention is certainly applicable in the same sense. When the number of tracks is increased, the code sequence becomes slightly longer, but an increase in the length of the output IDT 3 resulting from this is very small. Thus, the greater the number of tracks, the more apparent the advantageous effect of the present invention of making the frame region narrower.

Here, the number of possible code sequences for the matched filter will be explained. It is not true that any code sequences are used if they have at least a 1-bit difference. There exists a specific group of code sequences which achieves a large S/N ratio between the case where the code sequences have an at least 1-bit difference and the case where the code sequences perfectly match. Among them, the most frequently used code sequence is called M-sequence, which is generally used in the recent spectrum spread communication. The number of possible code sequences varies according to a code length, and, in general, the longer the code length, the greater the number of possible M-sequences. Their relationship will be summarized in TABLE 1 below from a reference (Hajime Marubayashi, Masao Nakagawa, Ryuji Kono, "Spectral Spread Communication and Its Application", pp. 72–75, edited by the Institute of Electronics, Information and Communication Engineers, Corona Publishing Co., Ltd., 1998).

TABLE 1

| BIT LENGTH OF OUTPUT LDT | NUMBER OF M-SEQUENCES |
| --- | --- |
| 6 | 6 |
| 7 | 6 |
| 8 | 18 |
| 9 | 16 |
| 10 | 48 |
| 11 | 60 |
| 12 | 176 |
| 13 | 144 |

Figure 1:
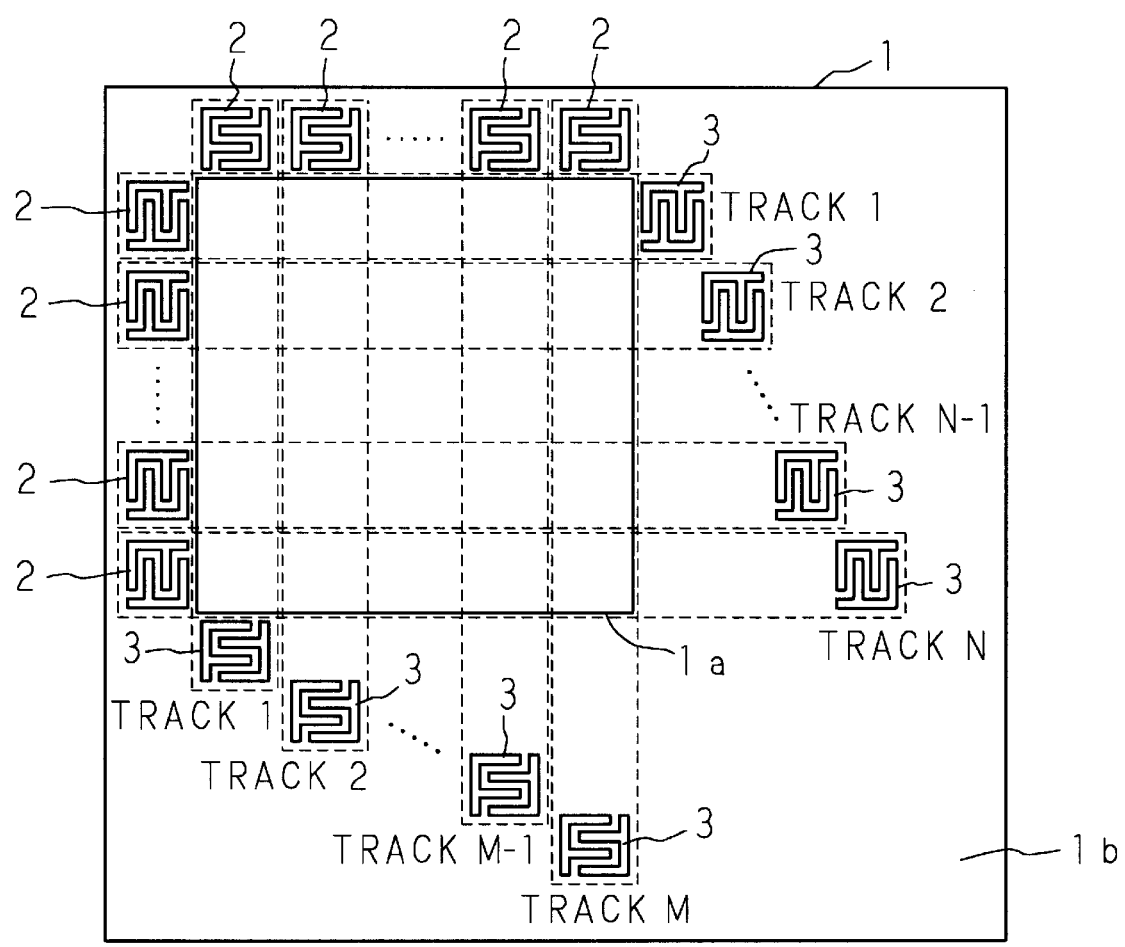
FIG. 1 is an illustration showing the structure of a conventional touch panel device.

It will be appreciated from TABLE 1 that, when the bit length is around 6 to 7 bits, the number of possible M-sequences is six, and therefore the advantageous effect obtained by using the present invention is less. The reason for this will be that, when a conventional touch panel device as shown in FIG. 1 is used, since the respective tracks are identified by delays in the propagation time of the surface acoustic waves, if identification is made by an at least 1-bit delay, an at least n-bit delay needs to be considered for the identification of n tracks.

However, as will be clearly appreciated from TABLE 1 that the advantageous effect of the present invention over the conventional example is more noticeable as the number of bits is increased to a certain degree. For example, when a 12-bit code length is used, the conventional example can identify only 12 tracks, but the present invention can identify a number of tracks as large as 176 tracks. In other words, in order to identify 176 tracks, the conventional example requires a frame region corresponding to a length of 176 bits, but the present invention requires a frame region corresponding to a length of only 12 bits, thereby reducing the width of the frame region to around $\frac{1}{15}$.

As described above, in order to meet a larger screen size or higher accuracy, the number of tracks to be identified needs to be increased, and the present invention produces an outstanding effect in such a situation.

Second Embodiment

Figure 9:
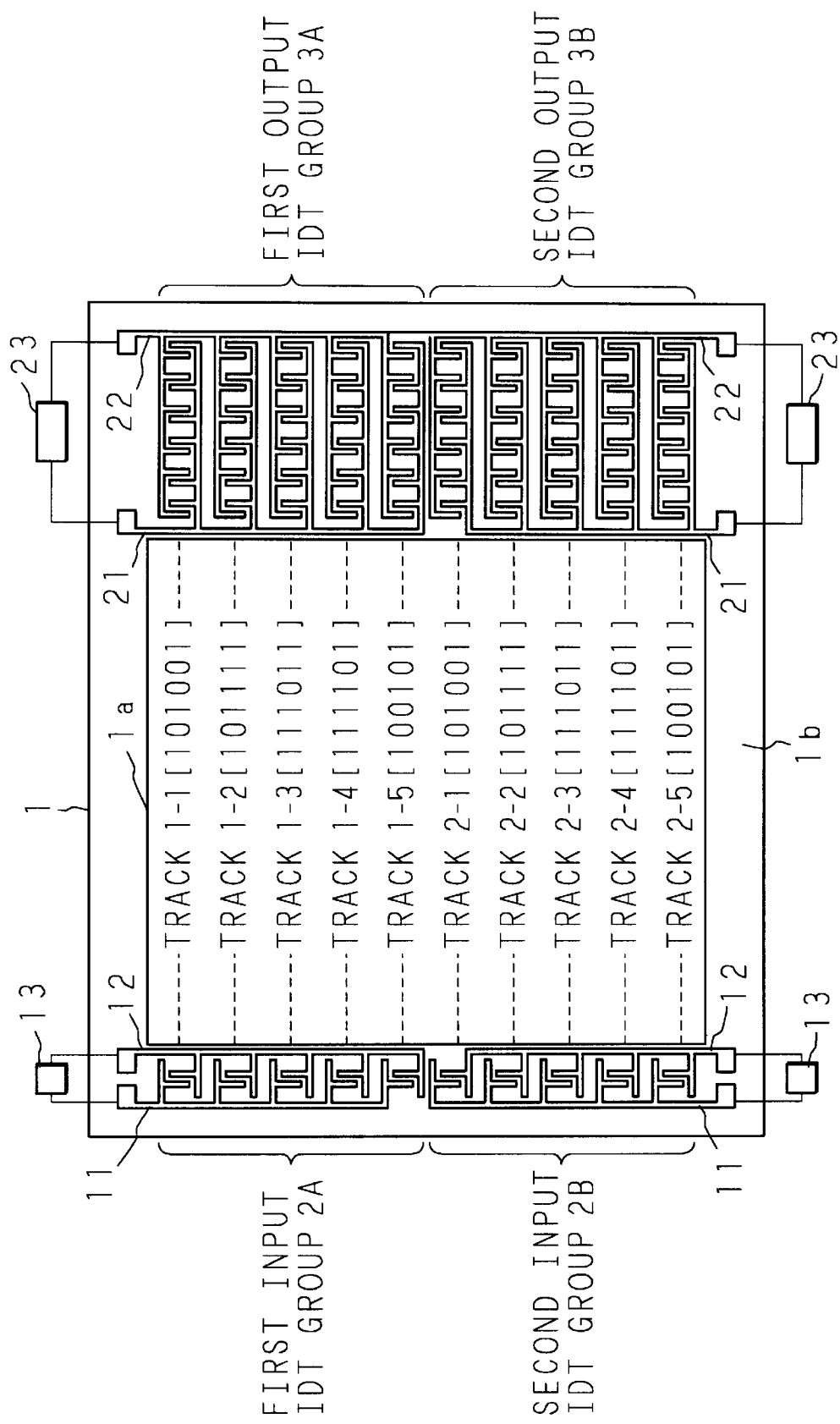
FIG. 9 is an illustration showing the structure of the second embodiment.

Next, the following description will explain an embodiment which can readily correspond to an increase in the number of tracks to be identified. In this second embodiment, the number of tracks to be identified can be increased without increasing the number of code sequences used in the matched filter. FIG. 9 is an illustration showing the structure of the second embodiment.

In this second embodiment, as shown in FIG. 9, a plurality (10 pieces) of input IDTs 2 and a plurality (10 pieces) of output IDTs 3 are respectively grouped into the first input IDT group 2A, the second input IDT group 2B, the first output IDT group 3A and the second output IDT group 3B, each consisting of five IDTs. The first input IDT group 2A corresponds to the first output IDT group 3A, while the second input IDT group 2B corresponds to the second output IDT group 3B. The five input IDTs 2 included in each of the first input IDT group 2A and the second input IDT group 2B are mutually connected in parallel by two input connecting lines 11 and 12. Moreover, the five output IDTs 3 included in each of the first output IDT group 3A and the second output IDT group 3B are mutually connected in parallel by two output connecting lines 21 and 22. Each of the input IDT groups 2A and 2B is provided with an independent signal application system (input signal application circuit 13). Besides, each of the output IDT groups 3A and 3B is provided with an independent signal detection system (position detection circuit 23). These two signal application systems and two signal detection systems are switched in time series for use.

On the other hand, a plurality (10 lines) of set tracks are grouped into two groups, each consisting of five tracks. In these two track groups, the same code sequences are used. In FIG. 9, the same code sequences are used between tracks 1-1 and 2-1; tracks 1-2 and 2-2; tracks 1-3 and 2-3; tracks 1-4 and 2-4; and tracks 1 and 2-5, respectively.

Figure 10:
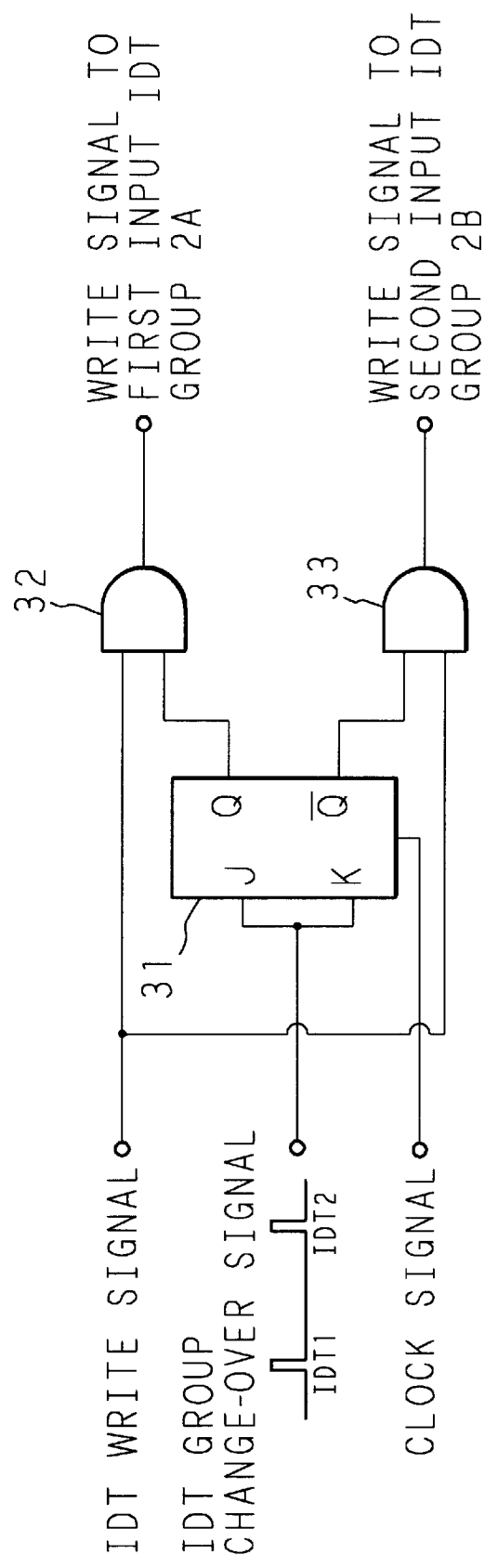
FIG. 10 is a circuit diagram of a control system for input signal application according to the second embodiment.

FIG. 10 is a structural view of a circuit for controlling application of input signals to the first input IDT group 2A and the second input IDT group 2B according to the second embodiment. This circuit includes one flip-flop 31; AND gate 32 to be supplied with a write signal to the input IDT and the Q output of the flip-flop 31; and AND gate 33 to be supplied with a write signal to the input IDT and the QBAR output of the flip-flop 31.

Regarding a method of applying input signals, after applying code sequences [101001] (corresponding to the track 1-1), [101111] (corresponding to the track 1-2), [111011] (corresponding to the track 1-3), [111101] (corresponding to the track 1-4) and [100101] corresponding to the track 1-5) in this order in time series to the respective input IDTs 2 of the first input IDT group 2A, the same code sequences are again applied in the same order to the respective input IDTs 2 of the second input IDT group 2B. At this time, the switching timing from the first input IDT group 2A to the second input IDT group 2B is controlled by a change-over signal inputted to the flip-flop 31.

Figure 11:
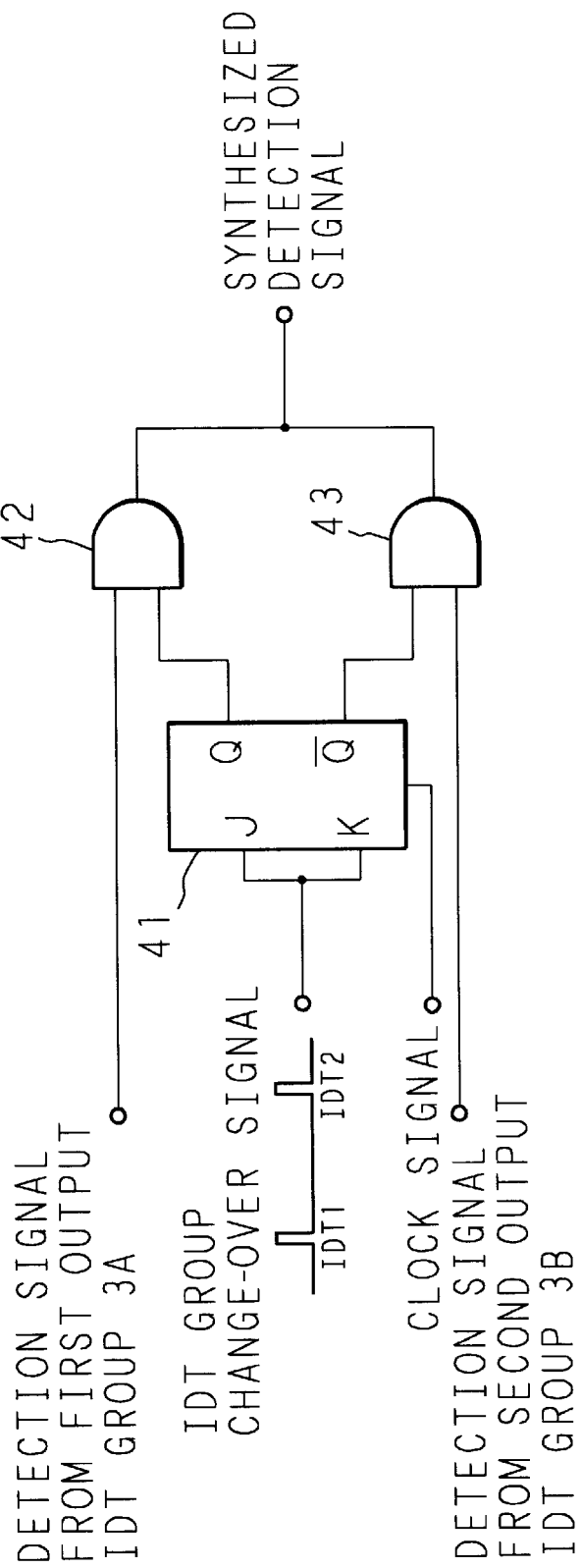
FIG. 11 is a circuit diagram of a control system for detection signal fetching according to the second embodiment.

FIG. 11 is a structural view of a circuit for controlling fetching of detection signals from the first output IDT group 3A and second output IDT group 3B according to the second embodiment. This circuit includes one flip-flop 41; AND gate 42 to be supplied with a detection signal from the first output IDT group 3A and the Q output of the flip-flop 41; and AND gate 43 to be supplied with a detection signal from the second output IDT group 3B and the QBAR output of the flip-flop 41. Besides, with the use of a change-over signal inputted to the flip-flop 41, the detection signals from the first output IDT group 3A and the second output IDT group 3B are synthesized in time series to output a single continuous detection signal.

In this second embodiment, the same code sequences for identification of tracks can be used twice, and therefore, even when short code sequences are used, it is possible to identify a large number of tracks. As a result, when the same number of tracks is used in the first and second embodiments, the second embodiment can make the length of the output IDT 3 shorter and the frame region narrower as compared to the first embodiment.

Figure 12:
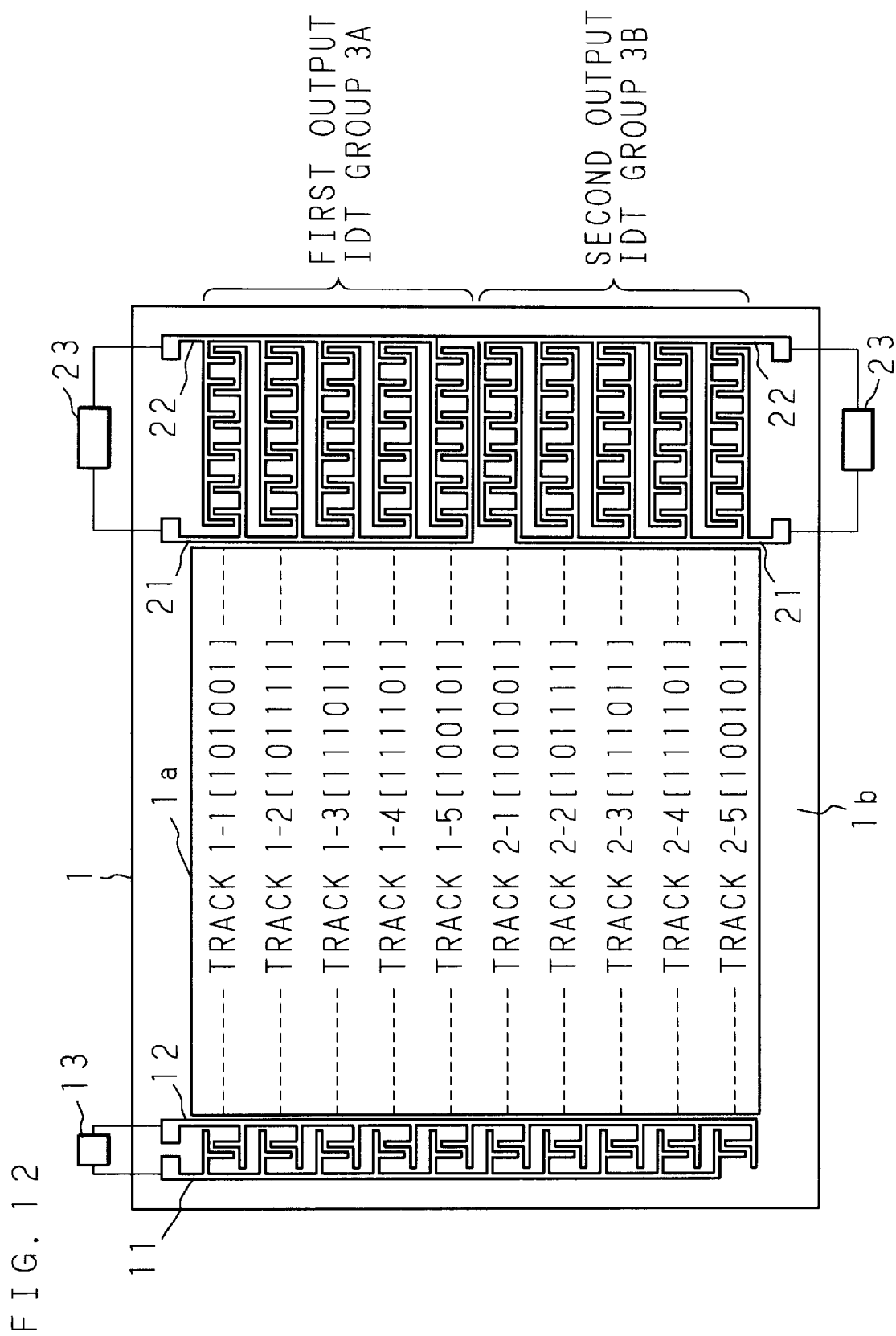
FIG. 12 is an illustration showing the structure of a modified example of the second embodiment.

FIG. 12 is an illustration showing the structure of a modified example of the second embodiment. In this modified example, a plurality (10 pieces) of output IDTs 3 are grouped into the first output IDT group 3A and the second output IDT group 3B, each consisting of five IDTs, but the input IDTs 2 are not grouped. In such an example, the same effect as that obtained by the structural example of FIG. 9 is exhibited. Moreover, in contrast to this modified example, even when only a plurality (10 pieces) of input IDTs 2 are grouped without grouping the output IDTs 3, the same effect is certainly obtained.

Further, while the input IDTs and the output IDTs are respectively grouped into two groups, this is merely an example and it is certainly possible to group them into 3 or more groups, respectively. Besides, it is not necessarily that the number of groups of the input IDTs and the number of groups of the output IDTs agree with each other. In general, as the number of groups is increased, the code length can be made shorter and the frame region can be made narrower, but the number of terminals drawn from the respective groups increases, resulting in a need for a wide region for connecting the terminals and a complicated processing circuit. It is therefore desirable to select an appropriate number of groups that achieves good overall efficiency. Further, while the position detection in the Y-direction has been explained, it is certainly possible to apply the second embodiment to the position detection in the X-direction orthogonal to the Y-direction.

Third Embodiment

Next, an embodiment that can correspond to a change in temperature will be explained. In this third embodiment, a change in the velocity of surface acoustic wave caused by a change in temperature can be compensated.

As described above, a surface acoustic wave element is constructed by forming a piezoelectric thin film on an IDT. In the surface acoustic wave element, a resonance frequency which is determined by the period of the IDT has dependence on temperature, depending on the type and film thickness of the piezoelectric film formed. This is derived from that the velocity of the surface acoustic wave under the piezoelectric thin film has dependence on temperature.

In the matched filter used in the touch panel device of the present invention, such temperature dependence of the velocity of the surface acoustic wave affects sensitively the magnitude of the detection signal. In other words, in the case where the fundamental frequency f (the frequency in (2) above) in writing a signal to the input IDT 2 is constant, the operation proceeds without any problems up to a certain temperature, but, when the temperature is raised to a temperature much higher than the certain temperature, the velocity of the surface acoustic wave decreases and therefore the wavelength in writing a signal at the frequency f becomes shorter.

Hence, in such a situation, the excitation efficiency at the input IDT 2 and the detection efficiency at the output IDT 3 are impaired, and the detection signal deteriorates even when an originally matching code sequence reaches. In contrast, when the temperature becomes very low, since the velocity of the surface acoustic wave is increased, the wavelength becomes longer, resulting in deterioration of the detection signal in the same manner as above. In order to avoid the effect of such a temperature environment, it is desirable to change the fundamental frequency f according to temperatures and it is further desirable to automatically change the fundamental frequency f.

Figure 13:
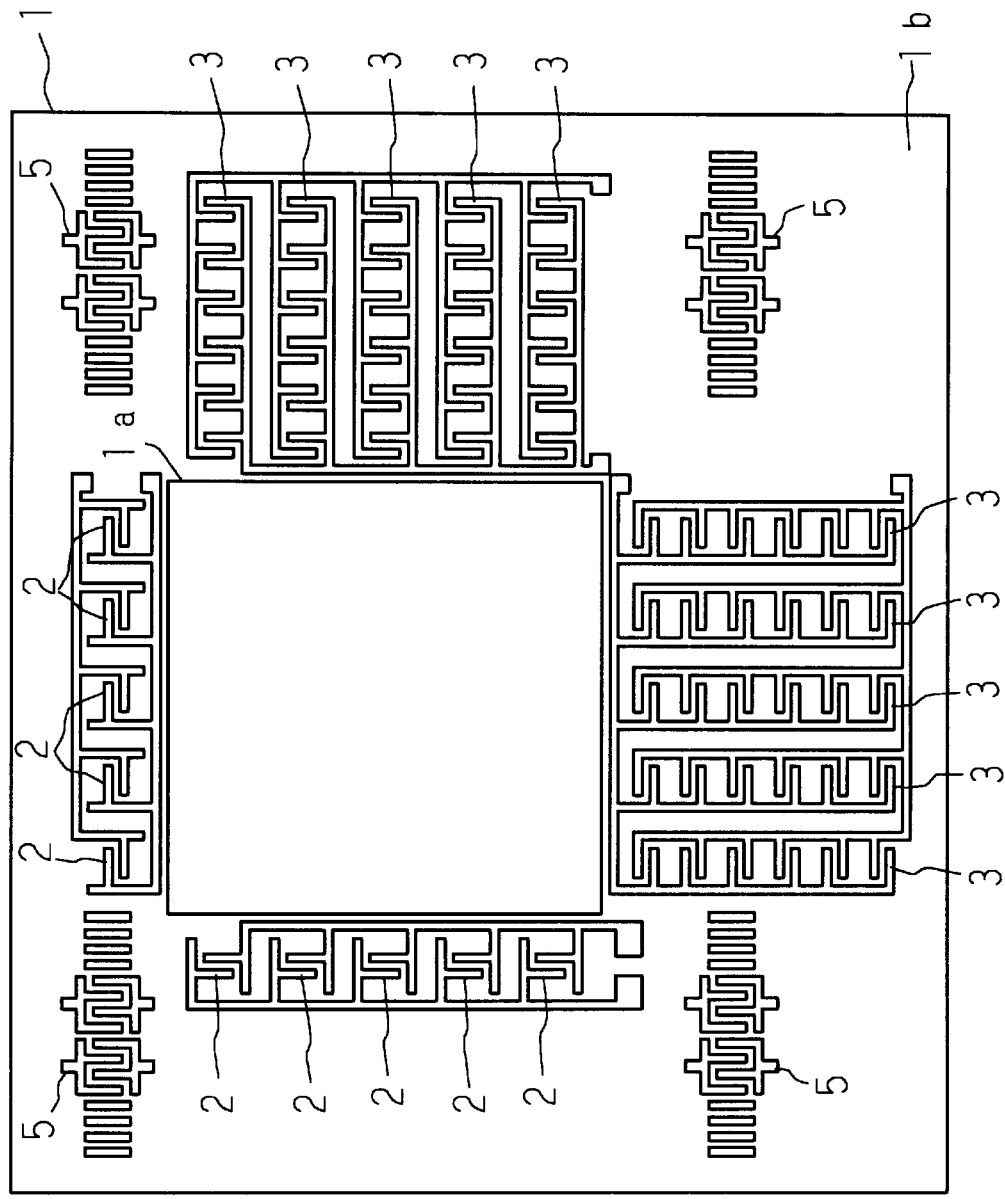
FIG. 13 is in illustration showing the structure of the third embodiment.

FIG. 13 is an illustration showing the structure of the third embodiment. In the third embodiment, a set of input/output IDTs 5 for temperature detection is provided at each of four corners of the glass plate 1. This input/output IDTs 5 for temperature detection have electrode fingers arranged at the same pitch ($p_3$) as in the input IDT 2 and output IDT 3.

By constructing an oscillator with the use of this input/output IDTs 5 for temperature detection, it is possible to directly detect a change in the frequency of the input IDT 2 and output IDT 3 due to a change in temperature from an oscillation output (oscillation frequency ft) of the oscillator. Since the input/output IDTs 5 are formed using the four corners of the glass plate 1 at which no input IDT 2 and output IDT 3 are present, no special region is required for the formation of the input/output IDTs 5, and thus the frame region is not particularly widened by the formation of the input/output IDTs 5. Further, since the temperature is detected at four positions by forming the input/output IDTs 5 at the respective corners of the glass plate 1, a high accuracy is achieved. It is certainly possible to adopt a structure where the input/output IDTs 5 are formed only at both ends of a diagonal line of the glass plate 1.

Figure 14:
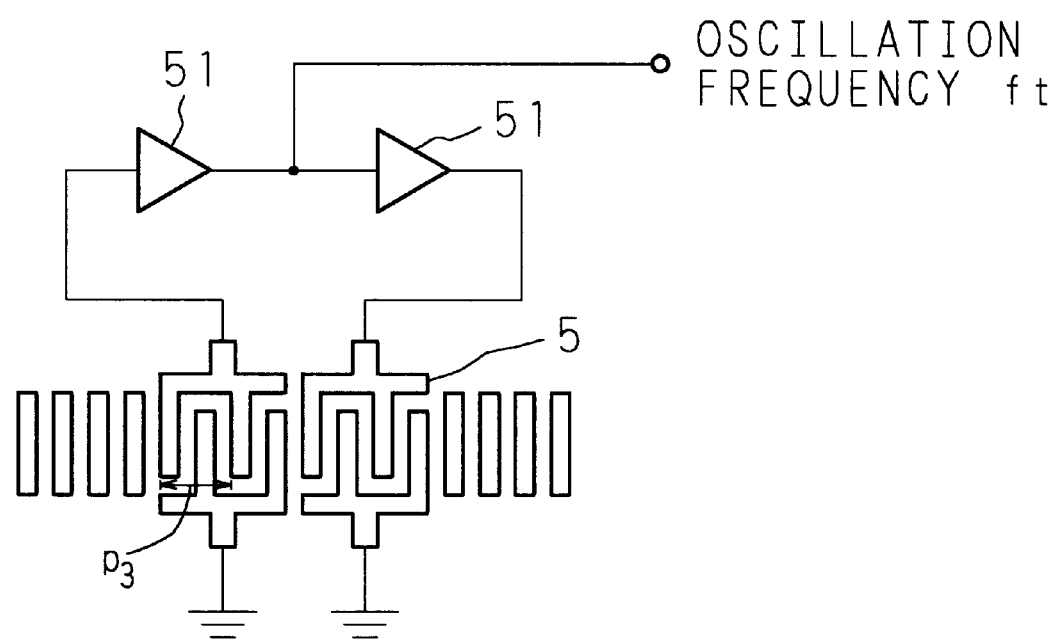
FIG. 14 is an illustration showing the structure of one example of an oscillator for temperature compensation.

FIG. 14 is an illustration showing one example of an oscillator constructed using the input/output IDTs 5 for temperature detection, and the illustrated oscillator is a phase transition type oscillator using a two-port resonator. This oscillator has operational amplifiers 51 connected to both of two ports of the input/output IDTs 5 for temperature detection. Note that a circuit for applying a bias voltage to the operational amplifiers 51 is omitted from the illustration.

The oscillation frequency ft of the oscillator shown in FIG. 14 is a frequency determined by the wavelength $p_3$ and the velocity of the surface acoustic wave, and this frequency agrees with the optimum frequency of the input IDT 2 and output IDT 3. If they do not agree with each other, an appropriate LC circuit may be added for their agreement. Then, once they agree with each other, the oscillation frequency ft varies in accordance with only temperatures, and its change agrees with a change in the optimum frequency of the input IDT 2 and output IDT 3 according to temperatures. Thus, the oscillation frequency ft of such an oscillator is amplified and the resultant amplified frequency is used as the fundamental frequency of a clock to be applied to the input signal application circuit 13.

Figure 15:
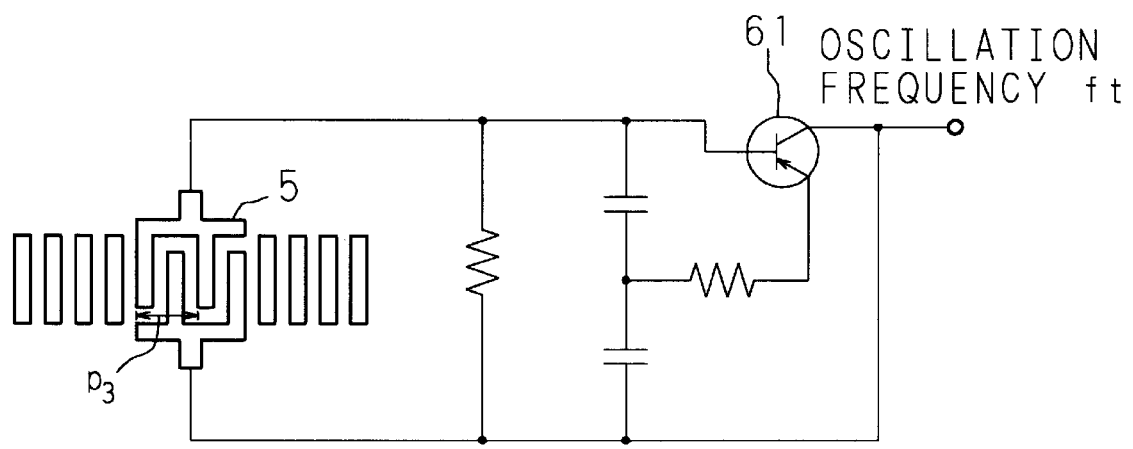
FIG. 15 is an illustration showing the structure of another example of an oscillator for temperature compensation.

FIG. 15 is a circuit diagram showing another example of an oscillator constructed using the input/output IDTs 5 for temperature detection, and the illustrated oscillator is a Colpitts type oscillator using a one-port surface acoustic wave resonator. In this oscillator, the oscillation frequency ft is obtained from a transistor 61. Note that a circuit for applying a bias voltage to the transistor 61 is omitted from the illustration.

In a modified example of the third embodiment, it is not necessarily that the fundamental period of the input/output IDTs 5 for temperature detection agrees with the fundamental period of the input IDT 2 and output IDT 3. In this case, the oscillation frequency ft of the oscillator for temperature detection is multiplied by an appropriate coefficient which does not vary according to temperatures, and a calibration frequency calculated by this multiplication may be used as the application frequency to the input IDT 2.

In a touch panel device of the present invention, each of a plurality of input IDTs has a wideband electrode structure, each of a plurality of output IDTs has a matched filter structure, and a specific signal sequence is varied according to each of a plurality of tracks. Therefore, even when a plurality of input IDTs and a plurality of output IDTs are both arranged into a line, it is possible to identify to which track an output signal is related, narrow the frame region and obtain a wide detection region.

In a touch panel device of the present invention, time-series signal sequences matching a plurality of output IDTs, respectively, are simultaneously applied to the respective input IDTs to synthesize the output signals of the plurality of output IDTs, and a touched position is detected based on the resultant synthesized signal. Therefore, since a touched track can be detected with a simple structure and the surface acoustic waves from the respective input IDTs are always excited in the same phase, no problems related to diffraction occurs, thereby improving the detection accuracy.

In a touch panel device of the present invention, since a predetermined time interval is introduced between adjacent signal sequences arranged in time series, it is possible to clearly distinguish the respective signal sequences, thereby preventing an erroneous operation of signal detection.

In a touch panel device of the present invention, since an output signal of a signal sequence corresponding to each output IDT is selectively fetched by masking using a gate signal, it is possible to accurately obtain only a detection signal of a desired signal sequence matching each output IDT, thereby preventing an erroneous operation of signal detection.

In a touch panel device of the present invention, a plurality of input IDTs and/or a plurality of output IDTs are grouped into blocks, and detection processing is performed independently in each block. Therefore, even when the detection region is wide and the number of tracks is large, it is possible to readily perform the detection without widening the frame region.

In a touch panel device of the present invention, the same signal sequence can be used for different blocks. Therefore, even when the detection region is wide and the number of tracks is large, it is possible to set effective binary signal sequences.

In a touch panel device of the present invention, since at least one set of input/output IDTs for temperature detection is provided, it is possible to compensate for a change in temperature, which affects the velocity of surface acoustic wave, and perform an accurate detection operation.

In a touch panel device of the present invention, since temperature compensation is performed using an oscillation output of a surface acoustic wave oscillator for oscillating a surface acoustic wave according to a detected temperature, it is possible to carry out temperature compensation in real time and perform an accurate detection operation.

In a touch panel device of the present invention, since a synthesized signal obtained by synthesizing the oscillation signal of the surface acoustic wave oscillator and signal sequences is applied to the input IDT, it is possible to perform automatic compensation for a change in temperature.

In the above embodiment, as shown in FIG. 6, the piezoelectric thin film is attached to the non-piezoelectric glass plate only at IDT portions, however, in other manner, a transparent piezoelectric material, for example, a quartz substrate may be used instead of the glass plate. In this case, the piezoelectric thin film becomes useless and the structure is more simple. It is obvious that the constitution of the present invention is effective in such a structure.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A touch panel device for detecting a position of an object by using a surface acoustic wave, comprising:
    a plurality of input IDTs, disposed to correspond to a plurality of tracks of a substrate where the surface acoustic wave can be propagated, respectively, for exciting surface acoustic waves; and
    a plurality of output IDTs, disposed to correspond to said plurality of tracks, respectively, for receiving the surface acoustic waves which have been excited by said plurality of input IDTs and propagated along said substrate,
    wherein each of said plurality of input IDTs has a wideband electrode structure, and each of said plurality of output IDTs has a matched filter structure for obtaining an output signal upon receipt of a specific signal sequence, the specific signal sequence varying according to each of said plurality of tracks;
    an application unit for generating the mutually different specific signal sequences in time series and simultaneously applying the generated time-series signal sequences to said plurality of input IDTs, respectively; and
    a detection unit for synthesizing output signals of said plurality of output IDTs and detecting a position of a track on which the object exists, based on a result of the synthesis.

2. The touch panel device of claim 1, wherein
during application of the time-series signal sequences to said plurality of input IDTs, respectively, a predetermined time interval is introduced between adjacent signal sequences arranged in time series.

3. The touch panel device of claim 1, wherein
said plurality of input IDTs and/or said plurality of output IDTs are grouped into a plurality of blocks, and the position of the object is detected independently in each block.

4. The touch panel device of claim 3, wherein
a same specific signal sequence is used for different blocks.

5. The touch panel device of claim 1, wherein said substrate is a transparent non-piezoelectric substrate.

6. The touch panel device of claim 5, wherein
quartz is used as said transparent non-piezoelectric substrate.

7. A touch panel device for detecting a position of an object by using a surface acoustic wave, comprising:
    a plurality of input IDTs, disposed to correspond to a plurality of tracks of a substrate where the surface acoustic wave can be propagated, respectively, for exciting surface acoustic waves; and
    a plurality of output IDTs, disposed to correspond to said plurality of tracks, respectively, for receiving the surface acoustic waves which have been excited by said plurality of input IDTs and propagated along said substrate,
    wherein each of said plurality of input IDTs has a wideband electrode structure, and each of said plurality of output IDTs has a matched filter structure for obtaining an output signal upon receipt of a specific signal sequence, the specific signal sequence varying according to each of said plurality of tracks;
    wherein gate signals are generated according to receiving timings of signal sequences matching said plurality of output IDTs, respectively, to selectively fetch an output signal of each of said plurality of output IDTs by masking.

8. The touch panel device of claim 7, wherein said plurality of input IDTs and/or said plurality of output IDTs are grouped into a plurality of blocks, and the position of the object is detected independently in each block.

9. The touch panel device of claim 8, wherein a same specific signal sequence is used for different blocks.

10. The touch panel device of claim 7, wherein said substrate is a transparent non-piezoelectric substrate.

11. The touch panel device of claim 10, wherein quartz is used as said transparent non-piezoelectric substrate.

12. A touch panel device for detecting a position of an object by using a surface acoustic wave, comprising:

a plurality of input IDTs, disposed to correspond to a plurality of tracks of a substrate where the surface acoustic wave can be propagated, respectively, for exciting surface acoustic waves; and a plurality of output IDTs, disposed to correspond to said plurality of tracks, respectively, for receiving the surface acoustic waves which have been excited by said plurality of input IDTs and propagated along said substrate, wherein each of said plurality of input IDTs has a wideband electrode structure, and each of said plurality of output IDTs has a matched filter structure for obtaining an output signal upon receipt of a specific signal sequence, the specific signal sequence varying according to each of said plurality of tracks; and wherein at least one set of input/output IDTs for detecting a temperature of said substrate.

13. The touch panel device of claim 12, wherein an amplifier is connected to said input/output IDTs for temperature detection so as to construct a surface acoustic wave oscillator, and temperature compensation is performed using an oscillation signal of said surface acoustic wave oscillator.

14. The touch panel device of claim 13, wherein said input/output IDTs for temperature detection have a fundamental period identical with a fundamental period of said input IDT and output IDT for position detection, synthesize said oscillation signal and said specific signal sequences, and apply the resultant synthesized signal to said input IDT for position detection.

15. The touch panel device of claim 12, wherein said plurality of input IDTs and/or said plurality of output IDTs are grouped into a plurality of blocks, and the position of the object is detected independently in each block.

16. The touch panel device of claim 15, wherein a same specific signal sequence is used for different blocks.

17. The touch panel device of claim 12, wherein said substrate is a transparent non-piezoelectric substrate.

18. The touch panel device of claim 17, wherein quartz is used as said transparent non-piezoelectric substrate.

* * * * *